(12) United States Patent
Furubayashi

(10) Patent No.: US 11,609,018 B2
(45) Date of Patent: Mar. 21, 2023

(54) CONTROL SYSTEM FOR CONTROLLING MULTIPLE APPARATUSES IN LINKAGE

(71) Applicant: DAIKIN INDUSTRIES, LTD., Osaka (JP)

(72) Inventor: Takashi Furubayashi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/213,599

(22) Filed: Dec. 7, 2018

(65) Prior Publication Data

US 2019/0107308 A1   Apr. 11, 2019

Related U.S. Application Data

(63) Continuation of application No. 15/563,356, filed as application No. PCT/JP2015/085038 on Dec. 15, 2015, now abandoned.

(30) Foreign Application Priority Data

Mar. 31, 2015 (JP) .................................. 2015-073562

(51) Int. Cl.
*F24F 11/64* (2018.01)
*G05B 15/02* (2006.01)
(Continued)

(52) U.S. Cl.
CPC ................ *F24F 11/58* (2018.01); *F24D 3/00* (2013.01); *F24D 3/14* (2013.01); *F24D 15/00* (2013.01);
(Continued)

(58) Field of Classification Search
CPC . F24F 11/62; F24F 11/54; F24F 11/65; G05B 2219/25086; H04L 12/2818;
(Continued)

(56) References Cited

U.S. PATENT DOCUMENTS 4,703,306 A   10/1987  Barritt
4,808,841 A   2/1989   Ito et al.
(Continued)

FOREIGN PATENT DOCUMENTS

JP   2001-14026 A   1/2001
JP   2002-243249 A  8/2002
(Continued)

OTHER PUBLICATIONS

International Search Report, issued in PCT/JP2015/085038 (PCT/ISA/210), dated Jan. 19, 2016.

*Primary Examiner* — Darrin D Dunn
(74) *Attorney, Agent, or Firm* — Birch, Stewart, Kolasch & Birch, LLP

(57) ABSTRACT

A highly versatile control system which is able to control devices in a linked manner is provided. The control system is configured to condition air of a single space 9, and includes: an air conditioner 2 and a floor heating apparatus 3 which cannot directly communicate with each other; a router 4 which is able to communicate with the air conditioner 2 and the floor heating apparatus 3 via communication lines 11 and 12; and a terminal device 5 which is connectable to the Internet 10 and is able to communicate with the router 4 via a communication line 13. The air conditioner 2 and the floor heating apparatus 3 are controlled in a linked manner by a control signal sent from the terminal device 5 via the router 4.

10 Claims, 6 Drawing Sheets

(51) Int. Cl.
| | | |
|---|---|---|
| *F24F 11/58* | (2018.01) | |
| *F24D 3/00* | (2022.01) | |
| *F24D 15/00* | (2022.01) | |
| *H04Q 9/00* | (2006.01) | |
| *F24F 11/89* | (2018.01) | |
| *G08C 17/02* | (2006.01) | |
| *F24D 3/14* | (2006.01) | |
| *F24D 19/10* | (2006.01) | |
| *F24F 5/00* | (2006.01) | |

(52) U.S. Cl.
CPC ........ *F24D 19/1009* (2013.01); *F24F 5/0089* (2013.01); *F24F 11/64* (2018.01); *F24F 11/89* (2018.01); *G05B 15/02* (2013.01); *G08C 17/02* (2013.01); *H04Q 9/00* (2013.01); *G08C 2201/40* (2013.01); *G08C 2201/93* (2013.01); *H04Q 2209/30* (2013.01); *H04Q 2209/40* (2013.01); *Y02B 30/00* (2013.01)

(58) Field of Classification Search
CPC ... H04L 12/2803; H04L 12/281; H04L 12/66; H04L 41/0803; H04W 48/18; H04W 60/04
See application file for complete search history.

(56) References Cited

U.S. PATENT DOCUMENTS

| | | | |
|---|---|---|---|
| 6,690,979 B1 | 2/2004 | Smith | |
| 7,127,305 B1 | 10/2006 | Palmon | |
| 7,161,483 B2 | 1/2007 | Chung | |
| 7,547,863 B2* | 6/2009 | Hardesty | F24D 19/1009 |
| | | | 219/482 |
| 7,809,472 B1* | 10/2010 | Silva | F24F 3/065 |
| | | | 700/277 |
| 7,819,331 B2* | 10/2010 | Arneson | F24F 11/62 |
| | | | 236/1 B |
| 7,822,489 B2* | 10/2010 | Shimba | G05B 15/02 |
| | | | 700/19 |
| 8,000,280 B2 | 8/2011 | Takechi et al. | |
| 8,019,478 B2* | 9/2011 | Whitehurst | F24F 11/30 |
| | | | 700/276 |
| 8,204,633 B2 | 6/2012 | Harbin, III et al. | |
| 8,214,671 B2 | 7/2012 | Boss et al. | |
| 8,239,068 B1* | 8/2012 | Rossi | F24F 3/065 |
| | | | 700/277 |
| 8,755,394 B2 | 6/2014 | Kaluskar et al. | |
| 9,188,994 B2 | 11/2015 | Steinberg | |
| 9,195,242 B2 | 11/2015 | Zobrist et al. | |
| 9,225,766 B2 | 12/2015 | Philip et al. | |
| 9,294,340 B1 | 3/2016 | Logue et al. | |
| 9,503,448 B2 | 11/2016 | Logue | |
| 9,531,704 B2 | 12/2016 | Erickson et al. | |
| 9,541,912 B1 | 1/2017 | Grossman, IV et al. | |
| 9,546,794 B1* | 1/2017 | Carson | F24F 3/14 |
| 2002/0000092 A1 | 1/2002 | Sharood et al. | |
| 2002/0022991 A1 | 2/2002 | Sharood et al. | |
| 2002/0069276 A1* | 6/2002 | Hino | H04L 12/2803 |
| | | | 709/223 |
| 2003/0140637 A1* | 7/2003 | Masui | F24F 11/30 |
| | | | 62/127 |
| 2005/0192051 A1 | 9/2005 | Tokuhashi | |
| 2005/0257006 A1* | 11/2005 | Yoshida | G05B 23/0283 |
| | | | 711/118 |
| 2006/0196953 A1* | 9/2006 | Simon | F24D 19/1096 |
| | | | 236/46 R |
| 2006/0248238 A1 | 11/2006 | Clark et al. | |
| 2007/0067450 A1 | 3/2007 | Malloy et al. | |
| 2007/0138163 A1* | 6/2007 | Hardesty | F24F 11/30 |
| | | | 219/482 |
| 2007/0138307 A1* | 6/2007 | Khoo | F24F 11/30 |
| | | | 236/1 C |
| 2007/0168058 A1* | 7/2007 | Kephart | G06F 11/2028 |
| | | | 714/E11.08 |
| 2007/0214248 A1 | 9/2007 | Ikeda et al. | |
| 2008/0275573 A1* | 11/2008 | Shimba | G05B 15/02 |
| | | | 700/19 |
| 2008/0282182 A1 | 11/2008 | Oosaka | |
| 2009/0167555 A1* | 7/2009 | Kohanek | G08C 17/02 |
| | | | 340/3.1 |
| 2009/0194601 A1 | 8/2009 | Flohr | |
| 2010/0014529 A1 | 1/2010 | Takechi et al. | |
| 2010/0082176 A1* | 4/2010 | Chang | H02J 3/14 |
| | | | 700/295 |
| 2010/0138007 A1 | 6/2010 | Clark et al. | |
| 2010/0268397 A1* | 10/2010 | Whitehurst | F24F 11/30 |
| | | | 700/299 |
| 2011/0015795 A1 | 1/2011 | Boyer et al. | |
| 2011/0106279 A1* | 5/2011 | Cho | G08C 17/02 |
| | | | 700/90 |
| 2011/0138058 A1 | 6/2011 | Ishida | |
| 2011/0219066 A1 | 9/2011 | Saint Clair et al. | |
| 2011/0257794 A1* | 10/2011 | Nishino | F24F 11/30 |
| | | | 700/277 |
| 2011/0289230 A1 | 11/2011 | Ueno | |
| 2012/0086562 A1 | 4/2012 | Steinberg | |
| 2012/0206245 A1 | 8/2012 | Uno | |
| 2012/0253521 A1* | 10/2012 | Storm | G05B 15/02 |
| | | | 700/276 |
| 2012/0261481 A1 | 10/2012 | Donian | |
| 2013/0074047 A1 | 3/2013 | Herden et al. | |
| 2013/0214600 A1 | 8/2013 | Van De Poel | |
| 2013/0245849 A1 | 9/2013 | Paul et al. | |
| 2013/0261821 A1 | 10/2013 | Lu et al. | |
| 2014/0059220 A1 | 2/2014 | Kim et al. | |
| 2014/0112154 A1 | 4/2014 | Malloy et al. | |
| 2014/0142726 A1* | 5/2014 | Bennett | G05B 19/042 |
| | | | 700/47 |
| 2014/0241354 A1 | 8/2014 | Shuman et al. | |
| 2014/0288672 A1 | 9/2014 | Noguchi | |
| 2014/0365018 A1 | 12/2014 | Kusukame et al. | |
| 2015/0005900 A1* | 1/2015 | Steele | G05B 15/02 |
| | | | 700/19 |
| 2015/0013001 A1* | 1/2015 | Lee | H04L 63/0823 |
| | | | 726/15 |
| 2015/0054631 A1* | 2/2015 | Hayes | G08C 17/02 |
| | | | 340/12.28 |
| 2015/0066169 A1 | 3/2015 | Nakano et al. | |
| 2015/0098455 A1 | 4/2015 | Fritsch | |
| 2015/0250076 A1* | 9/2015 | Kondo | H05K 7/20836 |
| | | | 361/679.48 |
| 2015/0333976 A1 | 11/2015 | Puttanna et al. | |
| 2015/0358229 A1 | 12/2015 | Steinacker et al. | |
| 2015/0382436 A1 | 12/2015 | Kelly et al. | |
| 2016/0041573 A1 | 2/2016 | Chen et al. | |
| 2016/0065910 A1 | 3/2016 | Fiedler | |
| 2016/0073482 A1 | 3/2016 | Fok et al. | |
| 2016/0087834 A1* | 3/2016 | Zhao | H04L 41/0803 |
| | | | 709/220 |
| 2016/0097557 A1 | 4/2016 | Steinberg | |
| 2016/0099826 A1 | 4/2016 | Logue et al. | |
| 2016/0138163 A1* | 5/2016 | Malinen | C23C 16/458 |
| | | | 427/255.28 |
| 2016/0195911 A1 | 7/2016 | Chapel et al. | |
| 2016/0227272 A1* | 8/2016 | Hatambeiki | H04N 21/2541 |
| 2016/0286475 A9* | 9/2016 | Unger | H04W 48/18 |
| 2016/0301543 A1* | 10/2016 | Min | G08C 17/02 |
| 2017/0097621 A1 | 4/2017 | Ackmann et al. | |
| 2017/0102681 A1 | 4/2017 | Verhoeven et al. | |
| 2017/0122617 A1 | 5/2017 | Sinha et al. | |
| 2017/0146969 A1 | 5/2017 | Yamada et al. | |
| 2017/0167746 A1 | 6/2017 | Harris | |
| 2017/0270365 A1 | 9/2017 | Laska et al. | |
| 2017/0284691 A1 | 10/2017 | Sinha et al. | |
| 2017/0308072 A1 | 10/2017 | Arensmeier | |
| 2018/0091327 A1 | 3/2018 | McLaughlin et al. | |
| 2018/0091381 A1 | 3/2018 | McLaughlin et al. | |

(56) References Cited

U.S. PATENT DOCUMENTS

2018/0158315 A1   6/2018   Sloo et al.
2018/0212792 A1   7/2018   Brandt

FOREIGN PATENT DOCUMENTS

| | | |
|---|---|---|
| JP | 2004-48218 A | 2/2004 |
| JP | 2005-20650 A | 1/2005 |
| JP | 2005-223438 A | 8/2005 |
| JP | 2007-166045 A | 6/2007 |
| JP | 2008-312047 A | 12/2008 |
| JP | 2013-210145 A | 10/2013 |
| JP | 2013-236149 A | 11/2013 |
| JP | 2013-240023 A | 11/2013 |
| JP | 2014-001907 A | 1/2014 |
| WO | WO 2011/058857 A | 5/2011 |
| WO | WO 2014/024442 A1 | 2/2014 |

\* cited by examiner

FIG.3

| TEMPERATURE LEVEL OF FLOOR HEATING || SET TEMPERATURE OF AIR CONDITIONER |
|---|---|---|
| LOW | 1 | 16°C |
| | 2 | 17°C |
| | 3 | 18°C |
| | 4 | 19°C |
| ↓ | 5 | 20°C |
| | 6 | 21°C |
| | 7 | 22°C |
| | 8 | 23°C |
| HIGH | 9 | 24°C |
| NOT SUPPORTED /NOT OBTAINED || NOT SET |

CONTROL SYSTEM FOR CONTROLLING MULTIPLE APPARATUSES IN LINKAGE

CROSS-REFERENCE TO RELATED APPLICATIONS

This application is a Continuation of co-pending application Ser. No. 15/563,356 filed on Sep. 29, 2017, which is a National Phase of PCT International Application No. PCT/JP2015/085038 filed on Dec. 15, 2015, which claims priority under 35 U.S.C. § 119(a) to Patent Application No. 2015-073562 filed in Japan on Mar. 31, 2015. All of the above applications are hereby expressly incorporated by reference into the present application.

TECHNICAL FIELD

The present invention relates to a control system which is configured to control a plurality of devices in a linked manner.

BACKGROUND ART

A system which has been known controls, in a linked manner, devices which are configured to condition air in the same space, such as a floor heating device and an air conditioner. For example, Patent Literature 1 recites that the linked control is performed as command signal generation means of the floor heating device sends a command signal for controlling the capability (room temperature) of the air conditioner to an air conditioner outdoor unit and sends a signal for controlling the capability (temperature of heating medium) of the floor heating device to a floor heating outdoor unit.

CITATION LIST

Patent Literature

Patent Literature 1: Japanese Unexamined Patent Publication No. 2013-210145

SUMMARY OF INVENTION

Technical Problem

When a plurality of devices are controlled in a linked manner as control signals are transmitted between the devices as described above, it is necessary to connect the devices by dedicated lines. In recent years, a highly versatile control system which is able to control devices in a linked manner without requiring dedicated equipment has been desired.

An object of the present invention is therefore to provide a highly versatile control system which is able to control devices in a linked manner.

Solution to Problem

A control system according to the first aspect of the invention includes: devices which are configured to condition air of a single space and are not able to directly communicate with one another; a relay unit which is able to mutually communicate with each of the devices via a first communication line; and an operating unit which is connectable to a public communication network and is able to communicate with the relay unit via a second communication line, the devices being controlled in a linked manner by a control signal sent from the operating unit via the relay unit.

In this control system, a dedicated line connecting the devices is unnecessary, and the linked control of the devices is possible by the control signal transmitted via the relay unit. Furthermore, because the operating unit is able to obtain application software for the linked control over the public communication network, a dedicated operating unit is not required. A highly versatile system is therefore realized.

According to the second aspect of the invention, the control system of the first aspect is arranged such that the devices include a floor heating apparatus, and linked control of the devices is carried out by controlling another one of the devices based on an operating state of the floor heating apparatus.

This control system makes it possible to swiftly achieve a comfortable temperature with less energy.

A control system according to the third aspect of the invention includes: devices which include a water heater for supplying hot water to a bathtub and at least one air conditioning device configured to condition air of a bathroom having the bathtub, the devices not being able to directly communicate with one another; a relay unit which is able to mutually communicate with each of the devices via a first communication line; and an operating unit which is connectable to a public communication network and is able to communicate with the relay unit via a second communication line, the devices being controlled in a linked manner by a control signal sent from the operating unit via the relay unit.

In this control system, a dedicated line connecting the devices is unnecessary, and the linked control of the devices is possible by the control signal transmitted via the relay unit. Furthermore, because the operating unit is able to obtain application software for the linked control over the public communication network, a dedicated operating unit is not required. A highly versatile system is therefore realized.

According to the fourth aspect of the invention, the control system of the third aspect is arranged such that linked control of the devices is carried out by controlling one of the devices different from the water heater based on an operating state of the water heater.

With this control system, the air condition of the bathroom system is controllable in accordance with the timing of hot water supply.

According to the fifth aspect of the invention, the control system of any one of the first to fourth aspects is arranged such that the relay unit is connectable to the public communication network, and the second communication line is a line in the public communication network.

With this control system, the linked control is possible anywhere as long as the connection to the public communication network is available.

According to the sixth aspect of the invention, the control system of any one of the first to fifth aspects is arranged such that a transmission process of signal transmission is carried out in the order of the operating unit, the relay unit, one of the devices, the relay unit, and the operating unit, and transmission processes regarding the respective devices are not simultaneously carried out.

With this control system, because the transmission processes regarding the respective devices are not simultaneously carried out, the control is simple.

According to the seventh aspect of the invention, the control system of any one of the first to fifth aspects is arranged such that a transmission process of signal transmission is carried out in the order of the operating unit, the relay unit, one of the devices, the relay unit, and the operating unit, and transmission processes regarding the respective devices are simultaneously carried out.

With this control system, because the transmission processes regarding the respective devices are simultaneously carried out, the processing speed is high.

According to the eighth aspect of the invention, the control system of any one of the first to seventh aspects is arranged such that the operating unit includes a storage unit which stores information regarding the devices.

With this control system, because a dedicated device for storing information regarding the devices is unnecessary, the versatility of the system is further improved.

According to the ninth aspect of the invention, the control system of the eighth aspect is arranged such that, after a data amount of the information stored in the storage unit reaches a predetermined amount, if a new piece of the information is further stored in the storage unit, a piece of the information stored in the storage unit, which is the oldest piece of information, is replaced with the new piece of information.

With this control system, as the data amount of the information regarding the devices stored in the storage unit of the operating unit does not exceed the predetermined amount, the storage unit is not required to have a large capacity.

Advantageous Effects of Invention

As described above, the present invention provides the following advantageous effects.

According to the first aspect of the invention, a dedicated line connecting the devices is unnecessary, and the linked control of the devices is possible by the control signal transmitted via the relay unit. Furthermore, because the operating unit is able to obtain application software for the linked control over the public communication network, a dedicated operating unit is not required. A highly versatile system is therefore realized.

According to the second aspect of the invention, it is possible to swiftly achieve a comfortable temperature with less energy.

According to the third aspect of the invention, a dedicated line connecting the devices is unnecessary, and the linked control of the devices is possible by the control signal transmitted via the relay unit. Furthermore, because the operating unit is able to obtain application software for the linked control over the public communication network, a dedicated operating unit is not required. A highly versatile system is therefore realized.

According to the fourth aspect of the invention, the air condition of the bathroom system is controllable in accordance with the timing of hot water supply.

According to the fifth aspect of the invention, the linked control is possible anywhere as long as the connection to the public communication network is available.

According to the sixth aspect of the invention, because the transmission processes regarding the respective devices are not simultaneously carried out, the control is simple.

According to the seventh aspect of the invention, because the transmission processes regarding the respective devices are simultaneously carried out, the processing speed is high.

According to the eighth aspect of the invention, because a dedicated device for storing information regarding the devices is unnecessary, the versatility of the system is further improved.

According to the ninth aspect of the invention, as the data amount of the information regarding the devices stored in the storage unit of the operating unit does not exceed the predetermined amount, the storage unit is not required to have a large capacity.

BRIEF DESCRIPTION OF DRAWINGS

FIG. 3 shows a control table stored in the memory of FIG. 2.

DESCRIPTION OF EMBODIMENTS

The following will describe a control system of an embodiment of the present invention with reference to the drawings.

First Embodiment

Figure 1:
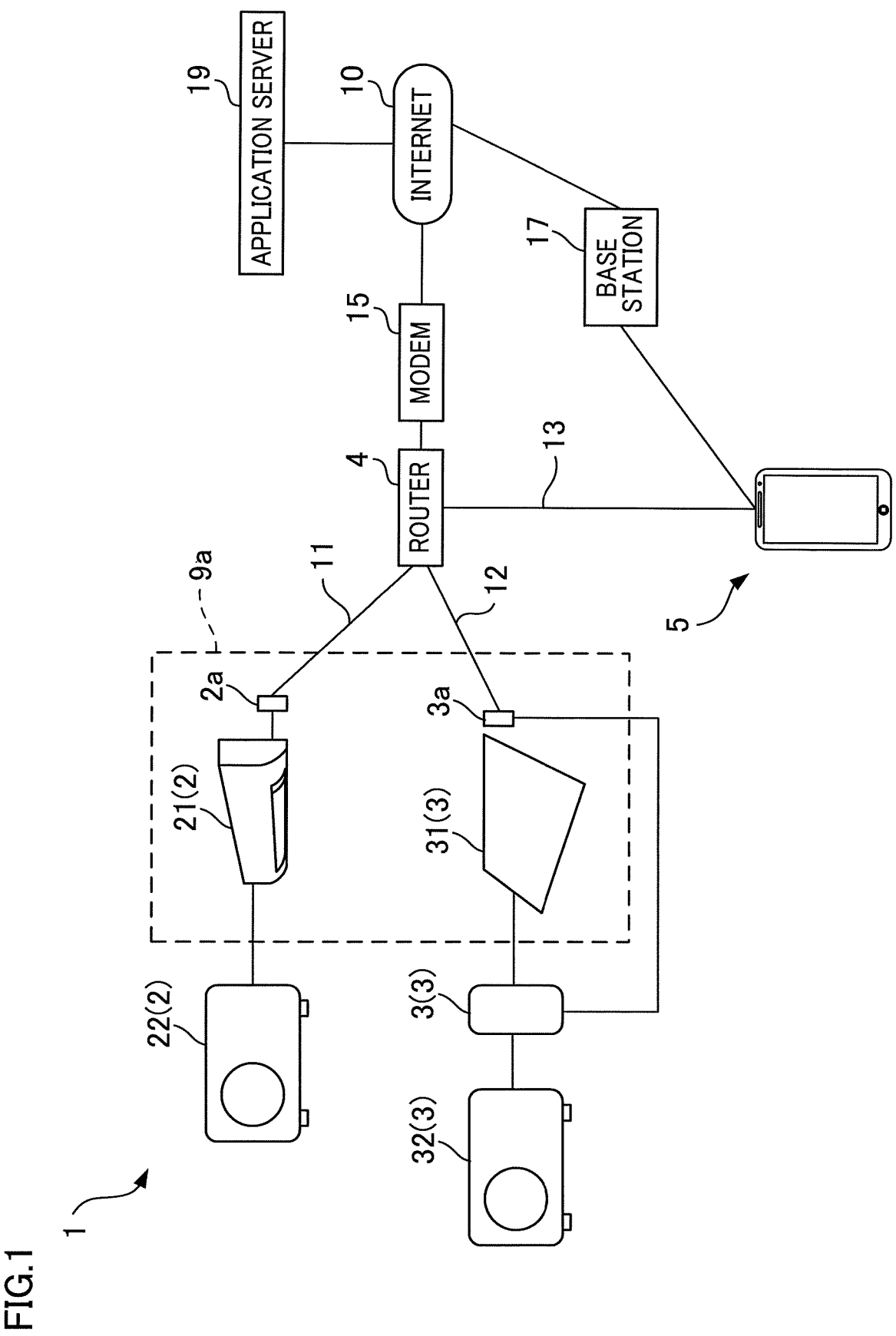
FIG. 1 is a schematic diagram of a control system of First Embodiment of the present invention.

As shown in FIG. 1, the control system 1 of the present embodiment is formed of an air conditioner 2, a floor heating apparatus 3, a router 4, and a terminal device 5. The air conditioner 2 includes an indoor unit 21 provided in a space 9 and an outdoor unit 22 provided outside the room. The floor heating apparatus 3 includes a floor heating panel 31 provided in the space 9, a heat pump unit 32 provided outside the room, and a floor heating unit 33 including an unillustrated heat exchanger which heats water to be supplied to the floor heating panel 31 by unillustrated refrigerant supplied from the heat pump unit 32. To put it differently, the air conditioner 2 and the floor heating apparatus 3 are configured to condition air in the same space 9. The air conditioner 2 and the floor heating apparatus 3 cannot directly communicate with each other.

The air conditioner 2 and the floor heating apparatus 3 include LAN connection adapters 2a and 3a, respectively. The router 4 is connectable to the Internet 10 by a modem 15. To the Internet 10, an application server 19 is connected to provide, to a client, application software for controlling devices such as the air conditioner 2 and the floor heating apparatus 3 in a linked manner. The terminal device 5 is a mobile terminal such as a smartphone and a PDA (Personal Digital Assistant), and is connectable to the Internet 10 via a base station 17. The terminal device 5 is able to download application software from the application server 19 over the Internet 10.

The air conditioner 2 and the router 4 are able to communicate with each other over a communication line 11. The floor heating apparatus 3 and the router 4 are able to communicate with each other over a communication line 12. The terminal device 5 and the router 4 are able to communicate with each other over a communication line 13. The communication lines 11 and 12 are wired link or wireless link. The communication line 13 is wireless link. Communications by wireless link are carried out in accordance with a standard such as Wi-Fi and Bluetooth (registered trademark). The router 4 performs routing so that a received signal is transmitted to any one of the air conditioner 2, the floor heating apparatus 3, and the terminal device 5.

The terminal device 5 is able to perform mutual communications with the air conditioner 2 and the floor heating apparatus 3 via the router 4. When the terminal device 5 is in a communication range (wireless communication range) of the router 4, the terminal device 5 is able to communicate with the router 4 via the communication line 13. When the terminal device 5 is not in the communication range of the router 4, the terminal device 5 is connected to the Internet 10 via the base station 17 and is able to communicate with the router 4 over the Internet 10. Between the air conditioner 2 and the terminal device 5, a first transmission process is carried out so that a signal is transmitted in the order of the terminal device 5, the router 4, the air conditioner 2, the router 4, and the terminal device 5. Between the floor heating apparatus 3 and the terminal device 5, a second transmission process is carried out so that a signal is transmitted in the order of the terminal device 5, the router 4, the floor heating apparatus 3, the router 4, and the terminal device 5. The first transmission process and the second transmission process are not simultaneously performed.

Figure 2:
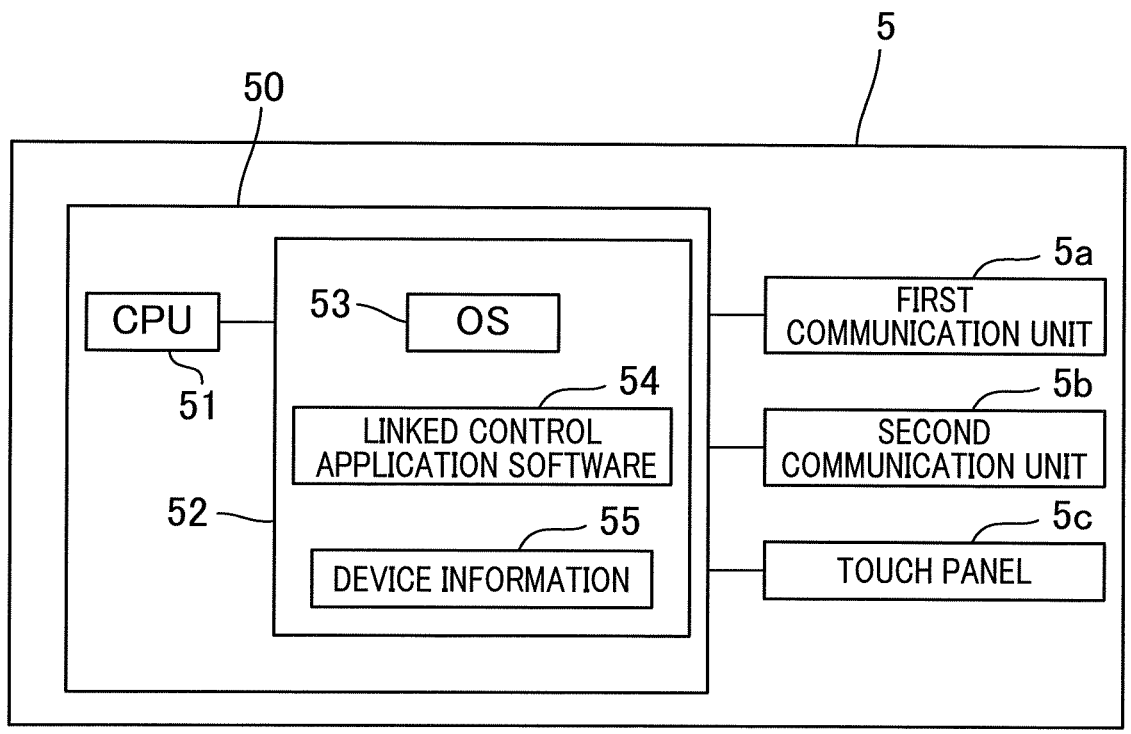
FIG. 2 is a block diagram schematically showing the electric structure of the terminal device of FIG. 1.

As shown in FIG. 2, the terminal device 5 includes a first communication unit 5a configured to communicate with the base station 17, a second communication unit 5b configured to communicate with the router 4 via the above-described communication line 13, a touch panel 5c functioning as both display means and receiving means for receiving an input from a user, and a controlling unit 50. The controlling unit 50 includes components such as a CPU (Center Processing Unit) 51 and a memory 52. The memory 52 includes a main storage formed of a volatile memory and an auxiliary storage formed of a non-volatile memory. In the auxiliary storage, an OS (Operating System) 53 and linked control application software 54 downloaded from the application server 19 are installed. A user of the terminal device 5 is able to turn on/off linked control setting by activating the linked control application software 54 and operating the touch panel 5c.

The auxiliary storage of the memory 52 further stores device information 55 of devices which are controlled in a linked manner by the linked control application software 54. The device information 55 includes, for example, information regarding the location of each device (i.e., information regarding which space is air-conditioned in case of an air conditioning device) and a control table for linked control, in connection with a plurality of devices. In the present embodiment, the air conditioner 2 is controlled by sending a control signal to the air conditioner 2 in accordance with the operating state of the floor heating apparatus 3. In this way, the air conditioner 2 and the floor heating apparatus 3 are operated in a linked manner. In this connection, as shown in the table in FIG. 3, the control table includes set temperatures of the air conditioner 2, which correspond to temperature levels (1 to 9) of the floor heating apparatus 3. With this, when the temperature level of the floor heating apparatus 3 is "1", the set temperature of the air conditioner 2 is controlled to be "16 degrees centigrade". As the temperature level of the floor heating apparatus 3 increases, the set temperature of the air conditioner 2 is controlled to increase.

The data amount of the device information 55 stored in the memory 52 is determined in advance. After the data amount of the device information 55 reaches a predetermined amount, if a new piece of information (e.g., information regarding air conditioning devices provided in a new space) is further added to the device information 55, a piece of the device information 55 stored in the memory 52, which is the oldest piece of information in the device information 55, is replaced with the new piece of information.

Figure 4:
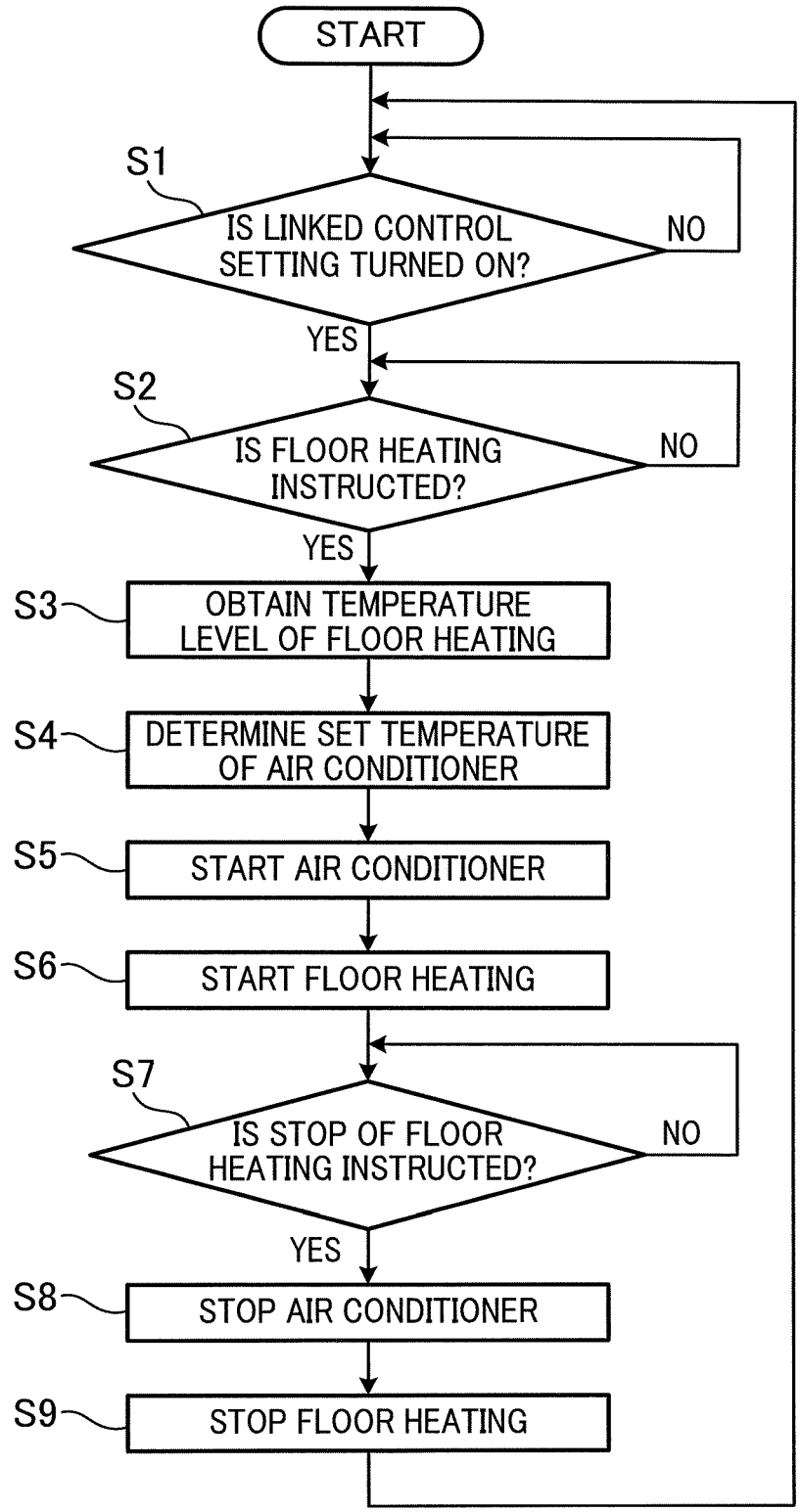
FIG. 4 is a flowchart showing an example of a process executed in the terminal device of FIG. 1 when linked control is performed.

Now, with reference to FIG. 4, an example of a process performed in the controlling unit 50 of the terminal device 5 when the air conditioner 2 and the floor heating apparatus 3 are controlled in a linked manner will be described. This process starts as the linked control application software 54 installed in the terminal device 5 is activated.

To begin with, whether linked control setting has been turned on is determined (S1). The step S1 is repeated until it is determined that the linked control setting has been turned on. When it is determined that the linked control setting has been turned on (YES in S1), whether the user has instructed to start the floor heating apparatus 3 is determined (S2). The start of the floor heating apparatus 3 is instructed through the terminal device 5. The step S2 is repeated until it is determined that the start of the floor heating apparatus 3 has been instructed.

When it is determined that the start of the floor heating apparatus 3 has been instructed (YES in S2), the currently-set temperature level of the floor heating apparatus 3 is obtained (S3) and the set temperature of the air conditioner 2 is determined based on the control table shown in FIG. 3 (S4). Thereafter, the air conditioner 2 is started at the set temperature determined in S4 (S5), and then the floor heating apparatus 3 is started (S6). Alternatively, the floor heating apparatus 3 may be started first, or the air conditioner 2 and the floor heating apparatus 3 may be simultaneously started.

Subsequently, whether an instruction to stop the floor heating apparatus 3 has been made through the terminal device 5 is determined (S7). The step S7 is repeated until it is determined that the stop of the floor heating apparatus 3 has been instructed. When it is determined that the stop of the floor heating apparatus 3 has been instructed (YES in S7), the air conditioner 2 is stopped (S8) and then the floor heating apparatus 3 is stopped (S9). Alternatively, the floor heating apparatus 3 may be started first, or the air conditioner 2 and the floor heating apparatus 3 may be simultaneously started. Then going back to the step S1, whether the linked control setting has been turned on is determined again.

<Characteristics of Control System of First Embodiment>

As described above, the control system 1 of the present embodiment is configured to condition air of a single space 9, and includes: the air conditioner 2 and the floor heating apparatus 3 which cannot directly communicate with each other; the router 4 which is able to communicate with the air conditioner 2 and the floor heating apparatus 3 via the communication lines 11 and 12; and the terminal device 5 which is connectable to the Internet 10 and is able to communicate with the router 4 via the communication line 13. The air conditioner 2 and the floor heating apparatus 3 are controlled in a linked manner by a control signal sent from the terminal device 5 via the router 4.

As such, a dedicated line connecting the air conditioner 2 with the floor heating apparatus 3 is unnecessary, and the linked control of the air conditioner 2 and the floor heating apparatus 3 is possible by the control signal transmitted via the router 4. Furthermore, because the terminal device 5 is able to obtain the linked control application software 54 over the Internet 10, a dedicated terminal device is not required. A highly versatile system is therefore realized.

In the control system 1 of the present embodiment, linked control is realized as the air conditioner 2 is controlled in accordance with the operating state of the floor heating apparatus 3. It is therefore possible to swiftly achieve a comfortable temperature with less energy.

In the control system 1 of the present embodiment, the router 4 is connected to the Internet 10. When the terminal device 5 is not in a wireless communication range of the router 4, the terminal device 5 is able to communicate with the router 4 over the Internet 10. The linked control is therefore possible anywhere as long as the connection to the Internet 10 is available.

In addition to the above, in the control system 1 of the present embodiment, the first transmission process of signal transmission in the order of the terminal device 5, the router 4, the air conditioner 2, the router 4, and the terminal device 5 and the second transmission process of signal transmission in the order of the terminal device 5, the router 4, the floor heating apparatus 3, the router 4, and the terminal device 5 are not simultaneously performed. The control is therefore simple.

In the control system 1 of the present embodiment, the device information 55 of a plurality of air conditioning devices controlled in a linked manner is stored in the auxiliary storage of the memory 52 of the terminal device 5. Because a dedicated device for storing information regarding a plurality of air conditioning devices is unnecessary, the versatility of the system is further improved.

In the control system 1 of the present embodiment, after the data amount of the device information 55 reaches a predetermined amount, if a new piece of information is further added to the device information 55, a piece of the device information 55 stored in the memory 52, which is the oldest piece of information in the device information 55, is replaced with the new piece of information. As the data amount of the device information 55 stored in the memory 52 of the terminal device 5 does not exceed the predetermined amount, the memory 52 is not required to have a large capacity.

Second Embodiment

The following describes Second Embodiment of the present invention. The present embodiment is mainly different from First Embodiment in that, while in First Embodiment the air conditioner 2 and the floor heating apparatus 3 both conditioning air in the space 9 are controlled in a linked manner, in the present embodiment a water heater 6 configured to supply hot water to a bathtub 61 and a floor heating apparatus 7 configured to condition air of a bathroom 9a in which the bathtub 61 is provided are controlled in a linked manner. Structures identical with those of First Embodiment are not explained again.

Figure 5:
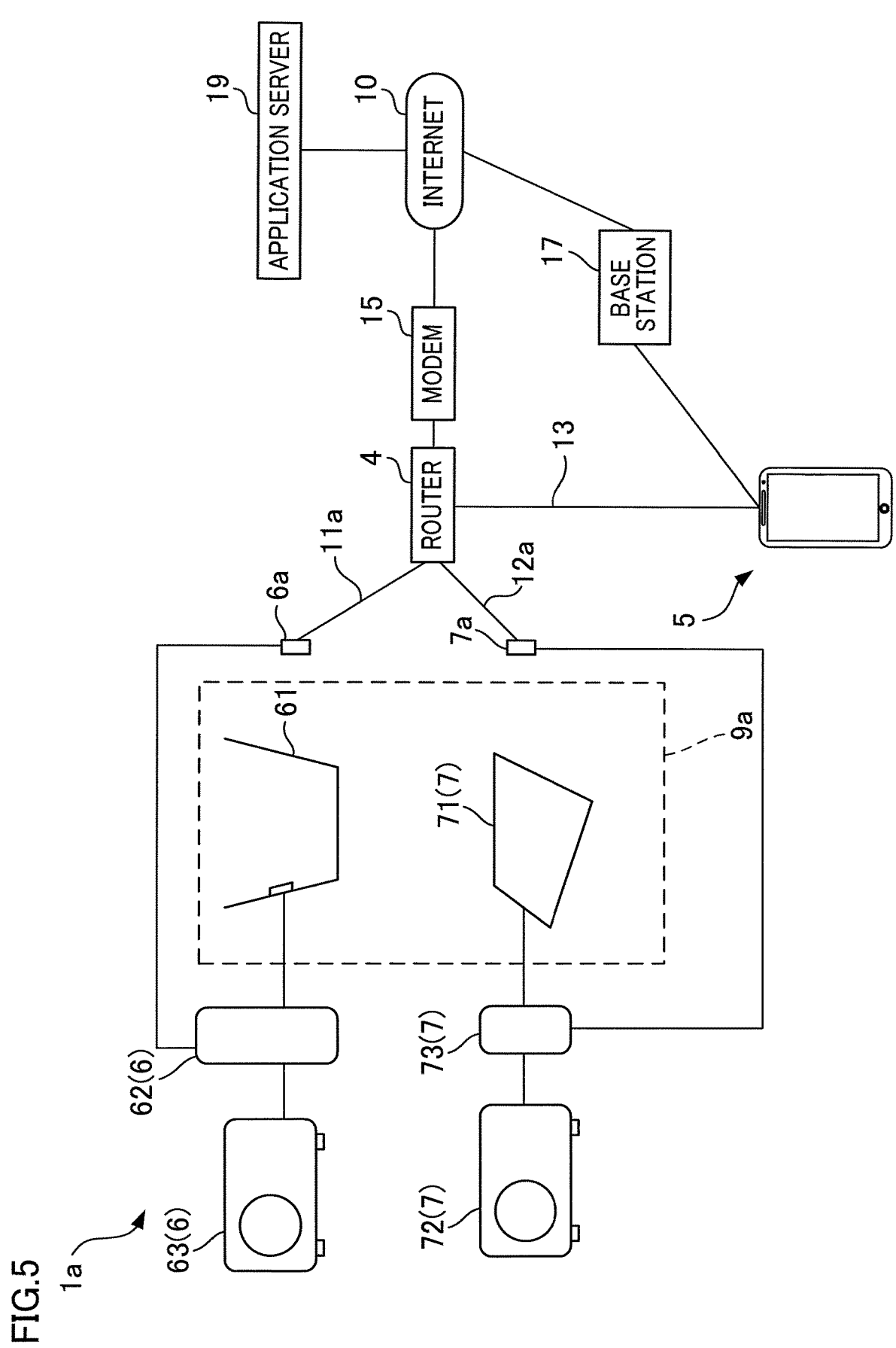
FIG. 5 is a schematic diagram of a control system of Second Embodiment of the present invention.

As shown in FIG. 5, a control system 1a of the present embodiment is formed of the water heater 6, the floor heating apparatus 7, a router 4, and a terminal device 5. The water heater 6 includes a heat pump unit 63 and a hot water tank 62 storing hot water heated by heat exchange with hot refrigerant at the heat pump unit 63. Hot water in the hot water tank 62 is supplied to the bathtub 61. The floor heating apparatus 7 includes a floor heating panel 71 provided in the bathroom 9a having the bathtub 61, a heat pump unit 72, and a floor heating unit 73 including an unillustrated heat exchanger which heats water to be supplied to the floor heating panel 71 by unillustrated refrigerant supplied from the heat pump unit 72. To put it differently, the floor heating apparatus 7 is configured to condition air in the bathroom 9a having the bathtub 61. The water heater 6 and the floor heating apparatus 7 cannot directly communicate with each other.

The water heater 6 and the floor heating apparatus 7 include LAN connection adapters 6a and 7a, respectively. The water heater 6 and the router 4 are able to communicate with each other over a communication line 11a. The floor heating apparatus 7 and the router 4 are able to communicate with each other over a communication line 12a. The communication lines 11a and 12a are wired link or wireless link. The router 4 performs routing so that a received signal is transmitted to any one of the water heater 6, the floor heating apparatus 7, and the terminal device 5.

The terminal device 5 is able to perform mutual communications with the water heater 6 and the floor heating apparatus 7 via the router 4. Between the water heater 6 and the terminal device 5, a third transmission process is carried out so that a signal is transmitted in the order of the terminal device 5, the router 4, the water heater 6, the router 4, and the terminal device 5. Between the floor heating apparatus 7 and the terminal device 5, a fourth transmission process is carried out so that a signal is transmitted in the order of the terminal device 5, the router 4, the floor heating apparatus 7, the router 4, and the terminal device 5. The third transmission process and the fourth transmission process are not simultaneously performed.

An auxiliary storage of a memory 52 of a controlling unit 50 of the terminal device 5 stores information regarding the water heater 6 and the floor heating apparatus 7 in addition to information regarding a plurality of air conditioning devices installed in a plurality of spaces, respectively (i.e., air conditioning devices conditioning air of respective spaces). In the present embodiment, the floor heating apparatus 7 is controlled by sending a control signal to the floor heating apparatus 7 in accordance with the operating state of the water heater 6. In this way, the water heater 6 and the floor heating apparatus 7 are operated in a linked manner.

Figure 6:
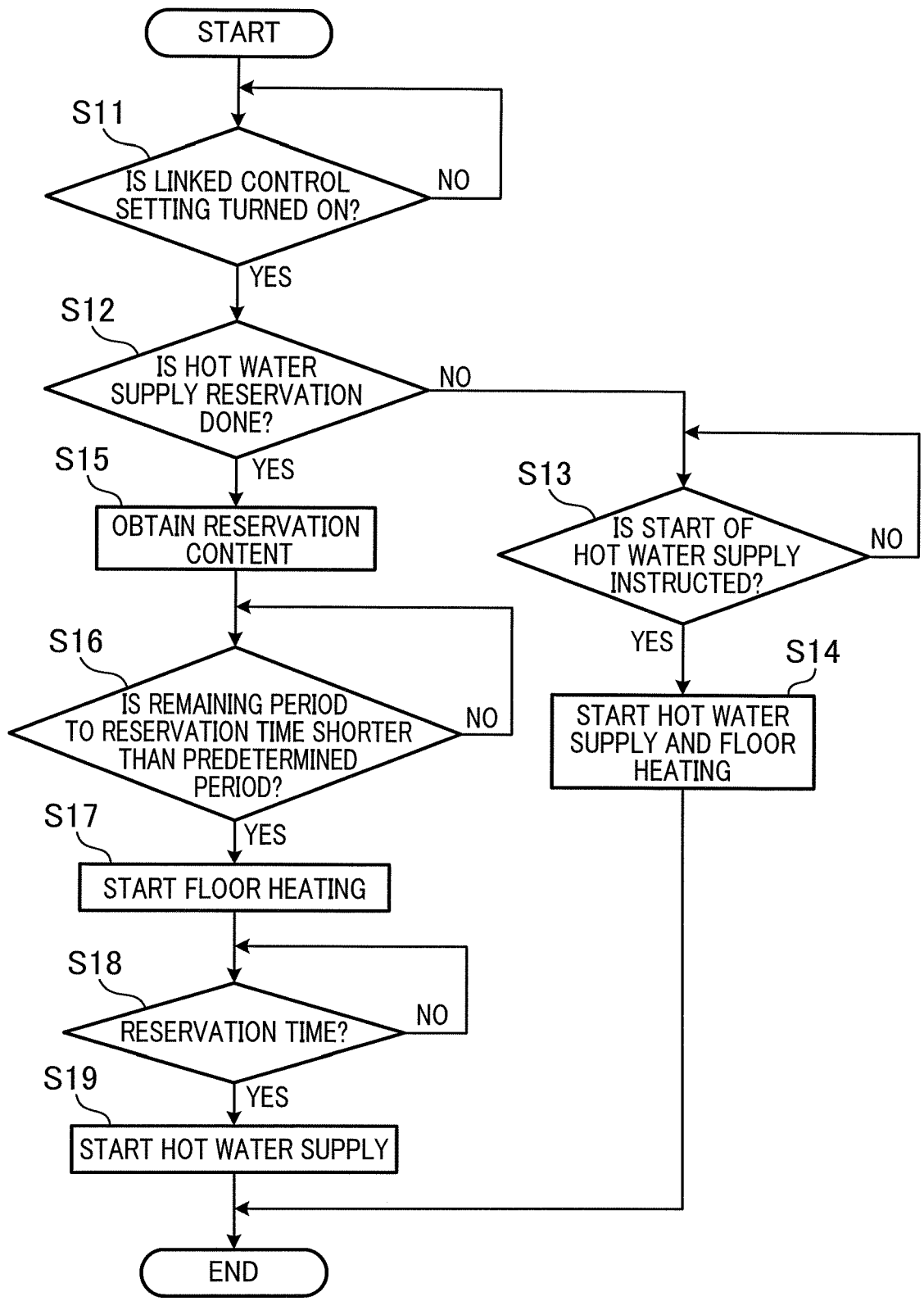
FIG. 6 is a flowchart showing an example of a process executed in the terminal device of FIG. 5 when linked control is performed.

Now, with reference to FIG. 6, an example of a process performed in the controlling unit 50 of the terminal device 5 when the water heater 6 and the floor heating apparatus 7 are controlled in a linked manner will be described. This process starts as the linked control application software 54 installed in the terminal device 5 is activated.

To begin with, whether linked control setting has been turned on is determined (S11). The step S11 is repeated until it is determined that the linked control setting has been turned on. When it is determined that the linked control setting has been turned on (YES in S11), whether hot water supply reservation has been done is determined (S12). The hot water supply reservation is carried out in such a way that the time to start hot water supply or the like is set by a user operating the terminal device 5 or an unillustrated remote controller of the water heater 6. When the hot water supply reservation has not been done (NO in S12), whether the start of the hot water supply has been instructed by the user is determined (S13). The start of the hot water supply is instructed through the unillustrated remote controller of the water heater 6. The step S13 is repeated until it is determined that the start of the hot water supply has been instructed. When it is determined that the start of the hot water supply has been instructed (YES in S13), the hot water supply and the floor heating apparatus 7 are simultaneously started (S14) and the process is terminated.

In the meanwhile, if it is determined in S12 that the hot water supply reservation has been done (YES in S12), the reservation content set in the water heater 6 is obtained (S15) and whether the remaining period to the reservation time is shorter than a predetermined period is determined (S16). The predetermined period is calculated by, for example, subtracting a hot water supply period Tb, which is from the start to the completion of the hot water supply, from a warming period Ta which is from the start of the floor heating apparatus 7 to the time at which the room temperature of the bathroom 9a becomes a temperature suitable for bathing. To put it differently, if the floor heating apparatus 7 is started at a time which is before the reservation time of the hot water supply by the predetermined period, the room temperature of the bathroom 9a becomes suitable for bathing at the finish of the hot water supply. In the present embodiment, the warming period Ta is longer than the hot water supply period Tb. The step S16 is repeated until it is determined that the remaining period to the reservation time is shorter than the predetermined period.

When the remaining period to the reservation time is shorter than the predetermined period (S16), the floor heating apparatus 7 is started (S17). Then whether the reservation time has come is determined (S18). The step S18 is repeated until it is determined that the reservation time has come. When the reservation time has come (YES in S18), the hot water supply starts (S19) and the process is terminated.

<Characteristics of Control System of Second Embodiment>

As described above, being similar to First Embodiment, the control system 1a of the present embodiment is arranged such that the water heater 6 and the floor heating apparatus 7 are controlled in a linked manner by a control signal sent from the terminal device 5 via the router 4. A highly versatile system is therefore realized.

In the control system 1a of the present embodiment, the floor heating apparatus 7 is controlled in accordance with the operating state of the water heater 6. Because the air condition of the bathroom 9a is controllable in accordance with the timing of hot water supply, it is possible to control the air condition of the bathroom 9a to be comfortable at the completion of the hot water supply.

Preferred embodiments of the present invention has been described. It should be noted that the present invention is not limited to the above-described embodiments, and various changes, substitutions, and alterations can be made herein without departing from the spirit and scope of the invention as defined by the appended claims.

For example, while in First and Second Embodiments above the terminal device 5 is a mobile terminal such as a smartphone and a PDA, the disclosure is not limited to this arrangement. As long as the terminal device 5 is connectable to the Internet 10, the terminal device 5 may be a non-portable device such as a desktop PC (Personal Computer).

Furthermore, while in First and Second Embodiments the floor heating apparatuses 3 and 7 and the water heater 6 are of the heat pump type, the floor heating apparatuses 3 and 7 and the water heater 6 may be of a gas type or an electric heater type.

First Embodiment above deals with a case where a plurality of devices controlled in a linked manner are the air conditioner 2 and the floor heating apparatus 3 and Second Embodiment deals with a case where a plurality of devices controlled in a linked manner are the water heater 6 and the floor heating apparatus 7 of the bathroom 9a. The devices controlled in a linked manner, however, are not limited to them. For example, on condition that air in the same space 9 is conditioned, an air purifier, a humidifier, a dehumidifier, a ventilator, etc. may be controlled in a linked manner in addition to the air conditioner 2 and the floor heating apparatus 3. Furthermore, on condition that air in the bathroom 9a having the bathtub 61 to which hot water is supplied from the water heater 6 is conditioned, a bathroom dryer, a ventilator, etc. may be controlled in a linked manner in addition to the floor heating apparatus 7.

First Embodiment deals with a case where the air conditioner 2 is controlled in accordance with the operating state of the floor heating apparatus 3 and Second Embodiment deals with a case where the floor heating apparatus 7 is controlled in accordance with the operating state of the water heater 6. The disclosure, however, is not limited to these embodiments. To be more specific, the floor heating apparatus 3 may be controlled in accordance with the operating state of the air conditioner 2 in First Embodiment, and the water heater 6 may be controlled in accordance with the operating state of the floor heating apparatus 7 in Second Embodiment.

While in First and Second Embodiments the router 4 is connected to the Internet 10, the router 4 may not be connected to the Internet 10.

In addition to the above, in First Embodiment, the first transmission process of signal transmission in the order of the terminal device 5, the router 4, the air conditioner 2, the router 4, and the terminal device 5 and the second transmission process of signal transmission in the order of the terminal device 5, the router 4, the floor heating apparatus 3, the router 4, and the terminal device 5 are not simultaneously performed, and in Second Embodiment the third transmission process of signal transmission in the order of the terminal device 5, the router 4, the water heater 6, the router 4, and the terminal device 5 and the fourth transmission process of signal transmission in the other of the terminal device 5, the router 4, the floor heating apparatus 7, the router 4, and the terminal device 5 are not simultaneously performed. The disclosure, however, is not limited to them. To be more specific, the first transmission process and the second transmission process may be carried out in a parallel manner in First Embodiment, and the third transmission process and the fourth transmission process may be carried out in a parallel manner in Second Embodiment. This increases the processing speed.

While in First and Second Embodiments the device information 55 of a plurality of air conditioning devices controlled in a linked manner is stored in the auxiliary storage of the memory 52 of the terminal device 5, the disclosure is not limited to this arrangement. A storage unit for storing the device information 55 may be provided in each of devices which are targets of linked control, such as the air conditioner 2, the floor heating apparatus 3, the water heater 6, and the floor heating apparatus 7, or may be provided in the router 4. Furthermore, a dedicated storage unit may be provided.

In First and Second Embodiments above, after the data amount of the device information 55 reaches a predetermined amount, if a new piece of information is further added to the device information 55, a piece of the device information 55 stored in the memory 52, which is the oldest piece of information in the device information 55, is replaced with the new piece of information. The disclosure, however, is not limited to this arrangement. To be more specific, a piece of device information 55, which is to be replaced with a new piece of device information 55, may be a piece of device information 55 which has not been referred to for the longest period of time, or may be a randomly-selected piece of device information 55.

In Second Embodiment above, the warming period Ta which is from the start of the floor heating apparatus 7 to the time at which the room temperature of the bathroom 9*a* becomes suitable for bathing is longer than the hot water supply period Tb which is from the start to the completion of the hot water supply. Alternatively, the warming period Ta may be shorter than the hot water supply period Tb. In this case, the flowchart of FIG. 6 is modified such that hot water supply starts at the reservation time, after the reservation content set in the water heater 6 is obtained in S15. Then the floor heating apparatus 7 is started when a period Tb-Ta elapses from the start of the hot water supply.

In First and Second Embodiments above, the terminal device 5 includes the first communication unit 5*a* communicating with the base station 17, and is connectable to the Internet 10 as the first communication unit 5*a* communicates with the base station 17. The connection to the Internet 10, however, may be achieved by another method. For example, the terminal device 5 may be able to communicate with a wireless LAN router by Wi-Fi or the like, and may be connectable to the Internet 10 by the wireless LAN router.

The Internet 10 of First and Second Embodiments above is an example of public communication networks. The terminal device 5 may be connectable to a network different from the Internet 10, as long as the network is available to the public for data communications.

REFERENCE SIGNS LIST

1, 1*a* control system
2 air conditioner
3 floor heating apparatus
4 router (relay unit)
5 terminal device (operating unit)
6 water heater
7 floor heating apparatus
9 space
9*a* bathroom
10 Internet (public communication network)
11, 12, 11*a*, 12*a* communication line (first communication line)
13 communication line (second communication line)
52 memory (storage unit)
61 bathtub

The invention claimed is:

1. An air conditioning control system comprising:
air conditioning devices which are configured to condition air of a single space and are not able to directly communicate with one another;
a relay unit which is able to mutually communicate with each of the air conditioning devices via a first communication line; and
a mobile terminal or a non-portable device which is connectable to a public communication network and is able to communicate with the relay unit via a second communication line, wherein,
the air conditioning devices are controlled in a linked manner such that the mobile terminal or the non-portable device sends a control signal comprising a target set-point temperature level or a target set-point temperature value in accordance with a set-point temperature level or a set-point temperature value of one of the air conditioning devices for another air conditioning device, to another one of the air conditioning devices, via the relay unit, and a set-point temperature level or a set-point temperature value of the another one of the air conditioning device is changed using said control signal, and control in the linked manner is performed such that, as a set-point temperature level or a set-point temperature value of the one of the air conditioning devices increases, a set-point temperature level or a set-point temperature value of the another one of the air conditioning devices is controlled to increase.

2. The air conditioning control system according to claim 1, wherein, the one of the air conditioning devices is a floor heating apparatus.

3. The air conditioning control system according to claim 1, wherein,
the relay unit is connectable to the public communication network, and
the second communication line is a line in the public communication network.

4. The air conditioning control system according to claim 1, wherein,
a transmission process of signal transmission is carried out in the order of the mobile terminal or the non-portable device, the relay unit, one of the air conditioning devices, the relay unit, and the mobile terminal or the non-portable device, and
transmission processes regarding the respective air conditioning devices are not simultaneously carried out.

5. The air conditioning control system according to claim 1, wherein
a transmission process of signal transmission is carried out in the order of the mobile terminal or the non-portable device, the relay unit, one of the air conditioning devices, the relay unit, and the mobile terminal or the non-portable device, and
transmission processes regarding the respective air conditioning devices are simultaneously carried out.

6. The air conditioning control system according to claim 1, wherein, the mobile terminal or the non-portable device includes a storage unit which stores information regarding the air conditioning devices.

7. The air conditioning control system according to claim 6, wherein, after a data amount of the information stored in the storage unit reaches a predetermined amount, if a new piece of the information is further stored in the storage unit, a piece of the information stored in the storage unit, which is the oldest piece of information, is replaced with the new piece of information.

8. The air conditioning control system according to claim 3, wherein, when the operating unit is in a communication range of the relay unit, the mobile terminal or the non-portable device is able to communicate with the relay unit via the second communication line, and when the mobile terminal or the non-portable device is not in the communication range of the relay unit, the mobile terminal or the non-portable device is connected to the public communication network and is able to communicate with the relay unit over the public communication network.

9. The air conditioning control system according to claim 1, wherein, application software for link control of the air conditioning devices is installed in the mobile terminal or the non-portable device.

10. An air conditioning control system comprising:
air conditioning devices which are configured to condition air of a single space and are not able to directly communicate with one another;
a relay unit which is able to mutually communicate with each of the air conditioning devices via a first communication line;

a mobile terminal or a non-portable device which is connectable to a public communication network and is able to communicate with the relay unit via a second communication line; and a storage unit storing a control table in which a set-point temperature level or a set-point temperature value of the one of the air conditioning devices is associated with a set-point temperature level or a set-point temperature value of the another one of the air conditioning devices, wherein the air conditioning devices are controlled in a linked manner such that the mobile terminal or the non-portable device sends a control signal comprising a target set-point temperature level or a target set-point temperature value in accordance with a set-point temperature level or a set-point temperature value of one of the air conditioning devices for another air conditioning device, to another one of the air conditioning devices, via the relay unit, and a set-point temperature level or a set-point temperature value of the another one of the air conditioning device is changed using said control signal, and the mobile terminal or the non-portable device determines the target set-point temperature level or the target set-point temperature value of the another one of the air conditioning devices based on the control table, and sends the control signal indicating the determined target set-point temperature level or target set-point temperature value to the another one of the air conditioning devices via the relay unit.

* * * * *